(12) United States Patent
Cho

(10) Patent No.: US 6,445,053 B1
(45) Date of Patent: Sep. 3, 2002

(54) MICRO-MACHINED ABSOLUTE PRESSURE SENSOR

(75) Inventor: Steve T. Cho, Santa Clara, CA (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/627,946

(22) Filed: Jul. 28, 2000

(51) Int. Cl.[7] .............................................. H01L 29/82
(52) U.S. Cl. ...................... 257/417; 257/419; 257/254; 257/704; 438/53
(58) Field of Search .......................... 73/718; 257/417, 257/254, 704, 419; 438/53; 600/488

(56) References Cited

U.S. PATENT DOCUMENTS

| | | | | |
|---|---|---|---|---|
| 4,701,826 A | * | 10/1987 | Mikkor | 361/283 |
| 4,773,972 A | * | 9/1988 | Mikkor | 204/16 |
| 5,155,061 A | * | 10/1992 | O'Connor et al. | 437/86 |
| 5,335,550 A | | 8/1994 | Satou | 73/727 |
| 6,109,113 A | * | 8/2000 | Chavan et al. | 73/718 |

FOREIGN PATENT DOCUMENTS

EP            0 633 459        1/1995

OTHER PUBLICATIONS

Cho et al., "An On–Chip Hermetric Packaging Technology For Micromechanical Devices", *Solid–State Sensor and Actuator Workshop Hilton Head Island*, South Carolina, 229–232 (1998).

* cited by examiner

Primary Examiner—David Nelms
Assistant Examiner—Thao P Le
(74) Attorney, Agent, or Firm—Brian R. Woodworth

(57) ABSTRACT

A micro-machined absolute pressure sensor and process for making the same. A semiconductor membrane having a welled portion connected to a planar periphery is formed in recess in a silicon substrate through etching and boron diffusion. A dielectric pad is formed on a portion of the planar periphery, and a bonding layer of polysilicon or amorphous silicon is deposited over the semiconductor membrane and the dielectric pad. After an etching process that defines the outline of the semiconductor membrane, the bonding layer is bonded to a nonconductive substrate in a vacuum using electrostatic bonding or wafer bonding, forming a vacuum-sealed reference cavity. A first and a second conductor are disposed on an upper surface of the nonconductive substrate. The first conductor serves as a capacitor plate disposed within the reference cavity and is connected to a transfer lead that passes from the cavity. The transfer lead is electrically isolated from the semiconductor membrane by the dielectric pad. The second conductor is electrically connected to the semiconductor membrane. The semiconductor membrane and the capacitor plate store an electrical charge that varies as a function of the distance between the capacitor plate and the semiconductor membrane. The semiconductor membrane flexes in response to pressure, changing the capacitance and the charge, so as to indicate the pressure of external fluid acting on the semiconductor membrane.

13 Claims, 5 Drawing Sheets

MICRO-MACHINED ABSOLUTE PRESSURE SENSOR

FIELD OF THE INVENTION

The present invention generally concerns pressure sensors, and more particularly, concerns micro-machined absolute pressure sensors and a process for making the same.

BACKGROUND OF THE INVENTION

The recent progress in micro-fabrication and micro-machining technologies is transforming the field of solid-state transducers, making possible the production of microelectromechanical systems (MEMS). In general, MEMS refers to the integration of sensors, actuators, and electronics using techniques originating in the semiconductor industry to realize miniature, high-performance. low-cost, electromechanical systems, with minimum feature sizes measured in microns. Miniaturization of mechanical systems in this manner is particularly attractive, since micro-mechanical devices and systems are inherently smaller, lighter, faster, and usually more precise than their macroscopic counterparts. MEMS devices are typically developed using computer-aided design (CAD) techniques created to facilitate VLSI (very large scale integration) production, and are typically batch produced using VLSI-based fabrication tools. Like integrated circuits, MEMS devices are rapidly progressing toward smaller size, higher speed, and greater functionality. Furthermore, because of batch processing, another major benefit of MEMS technology is its ability to drive down component cost.

Examples of MEMS devices include miniature fluid-pressure sensors and flow sensors, accelerometers, gyroscopes, and micro-optical devices. With a projected market of several billion dollars, pressure sensors are among the most important MEMS devices. While a majority of the semiconductor-based pressure transducers employ piezoresistive elements, devices that measure pressure based on changes in capacitance have become the focus for new developments to achieve higher pressure sensitivity, lower temperature sensitivity, and reduced power consumption. As with typical capacitors, these devices generally include a pair of conductive elements that are separated by a space. One or both of the elements flexes in response to pressure variations, thereby causing the capacitance measured between the conductive elements to change.

A capacitive pressure sensor disclosed in U.S. Pat. No. 4,853,699 has a generally hat-shaped semiconductor membrane that is attached around its periphery to a substrate to form a sealed-reference cavity. A conductive pad is disposed within the reference cavity. When a voltage differential is applied between the conductive pad and the semiconductor membrane, a capacitive charge is stored by the device. As the external pressure changes, the semiconductor membrane flexes, reducing the distance between the conductive elements, and thus changing the capacitance of the sensor.

In the method disclosed in the above-noted patent, the semiconductor membrane is fabricated by first forming a post of an etchable material on the surface of the substrate. Etchable silicon dioxide ridges at a height lower than the post are then formed on the substrate extending inwardly to contact the post. Polycrystalline silicon is deposited over the post and ridges, and the substrate is then etched to remove the post and the silicon dioxide ridges, leaving the polysilicon. This process forms a cavity with a plurality of channels extending therethrough. In order to seal the cavity, the substrate is exposed to a gas or vapor atmosphere, which causes growth of a material in the channels, closing them.

In many applications, it is necessary to measure pressure with a very high resolution, over a wide temperature range (e.g., −25° C. through 85° C.). Additionally, it is often necessary to sense absolute pressure. In order to monitor absolute pressure, a pressure transducer must include a vacuum-sealed reference cavity. Such a reference cavity cannot be obtained using the method and structure disclosed in the above-identified patent. No prior art MEMS devices are known that can provide a high resolution, absolute pressure measurement. Accordingly, it would be desirable to provide a capacitive micro-machined absolute pressure sensor having a vacuum-sealed reference cavity. Additionally, it would be desirable to produce such a sensor using a batch process that reduces the number of processing steps and masks required, compared with prior art processing methods for producing similar devices.

SUMMARY OF THE INVENTION

In accord with the present invention, an absolute pressure sensor including a vacuum-sealed reference cavity and method for making the sensor by micromachining a silicon substrate is provided. The sensor includes a flexible semiconductor membrane defining a cavity that is bonded to a substrate. preferably glass or silicon, under a high vacuum to form a vacuum-sealed reference cavity using a combination of eutectic and anodic bonding techniques. A first conductor is disposed within the cavity, and a transfer lead extends therefrom through the cavity wall. A nonctonductive pad, preferably made of a dielectric material, is disposed between the transfer lead and the semiconductor membrane so as to electrically isolate the semiconductor membrane from the transfer lead. Additionally, a second conductor is connected to the semiconductor membrane. When a voltage differential is applied across the two conductors, a capacitive charge is built up between the first conductor and the semiconductor membrane. As the external pressure changes, the semiconductor membrane flexes, changing the distance between portions of the membrane and the first conductor, causing the capacitance to change.

The absolute pressure sensor is preferably fabricated using a batch manufacturing process. First, a plurality of cavities are formed in the top surface of a silicon wafer, preferably by applying a first mask to the silicon wafer and bulk machining the silicon wafer with a chemical etchant. A semiconductor layer is then formed over the top surface of the silicon wafer and the plurality of cavities through boron diffusion. A plurality of dielectric pads are then formed adjacent to corresponding cavities using a second mask. Next. a nonconductive bonding layer is formed over the semiconductor layer and the plurality of dielectric pads by deposition of polysilicon or amorphous silicon. Material in proximity to each cavity is etched away from the silicon wafer using a third mask so as to define a plurality of individual sensor membranes. Each membrane comprises a welled portion connected to a planar periphery upon which a dielectric pad is disposed. The silicon wafer is next turned over, and the peripheries of the membranes are bonded to a nonconductive substrate, preferably glass, on the upper surface of which are disposed a plurality of conductors arranged so as to provide a pair of conductors for each sensor membrane. The silicon wafer and the nonconductive substrate are bonded in a vacuum so that when the bonding layer of each membrane is bonded to the top surface of the nonconductive substrate, a plurality of vacuum-sealed reference cavities are formed, each reference cavity having a pair of conductors extending therefrom. One of the conductors extends into the reference cavity and is electrically isolated from the membrane by the dielectric pad, and the other conductor is in electrical contact with the semiconductor membrane. Preferably, the conductors are produced by depositing gold on the nonconductive substrate. If the nonconductive substrate is glass, an electrostatic bonding process is performed that causes the gold to migrate into the bonding layer and form a eutectic seal with the glass. The dielectric pad prevents the gold from the lead connecting the conductor disposed in the cavity from reaching the semiconductor membrane, while a portion of the gold in the other conductor, which comprises a contact, migrates through the bonding layer to form an electrical contact with the semiconductor membrane. After bonding is completed, excess portions of the silicon wafer and the nonconductive substrate are removed to define the final shape of the sensor.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
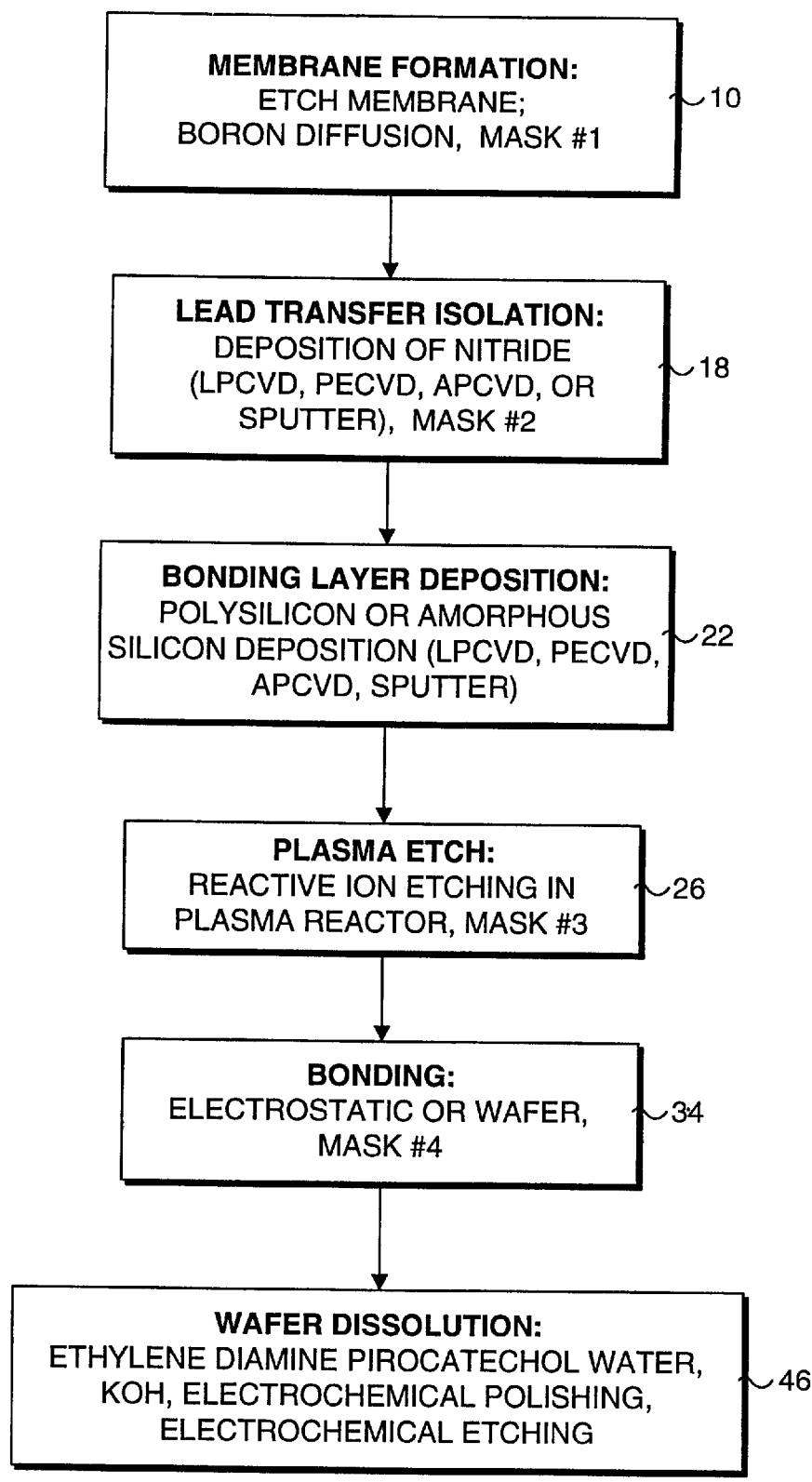
FIG. 1 is a process flow chart illustrating the processing steps used to fabricate an absolute pressure sensor in accord with the present invention.
Figure 2:
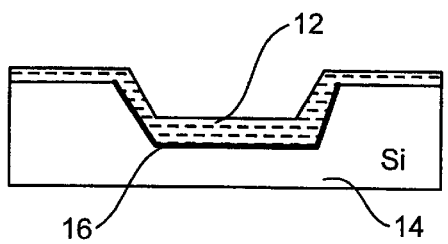
FIG. 2 is a cross-sectional view showing the construction of the absolute pressure sensor after a first processing step, in which a recess is etched into a silicon substrate and a semiconductor layer is formed.

With reference to FIGS. 1 and 2, the process for manufacturing an absolute pressure sensor in accord with the present invention begins with a first processing step 10, in which a semiconductor membrane 12 is formed on a silicon substrate 14. In general, a plurality of pressure sensors of the type described below are preferably manufactured in a batch process following steps somewhat like those used in semiconductor manufacturing processes. Accordingly, silicon substrate 14 will typically comprise a four-, six-, or eight-inch silicon wafer on which a plurality of absolute pressure sensors are fabricated. However, for simplicity, manufacturing steps for fabricating only a single sensor are shown in FIGS. 2–7 and described below. In addition, it will be understood that the various layers comprising the absolute pressure sensor are very thin, but for clarity, the dimensions of these layers as shown in the Figures are much exaggerated.

During first processing step 10, a first mask is applied to silicon substrate 14 defining a recess 16 (indicated by the bold width line in FIG. 2), which is etched into silicon substrate 14 using a conventional bulk-machining etching process, such as chemical etching with potassium hydroxide (KOH). After silicon substrate 14 is etched, semiconductor membrane 12 is formed over a portion of the upper surface of the silicon substrate and recess 16 through boron diffusion carried out at a temperature of about 1150° C. for 1–15 hours. It is important to note that semiconductor membrane 12 only comprises a layer of semiconductor material at this point, but will be formed into a membrane during later processing. The duration of the boron diffusion process occurring at this elevated temperature is selected to produce a desired membrane thickness, which preferably will be in the range of 2–10 microns.

Figure 3:
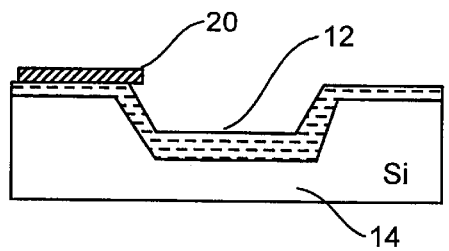
FIG. 3 is a cross-sectional view showing the construction of the absolute pressure sensor after a second processing step, in which a dielectric pad is deposited adjacent to the recess.
Figure 8:
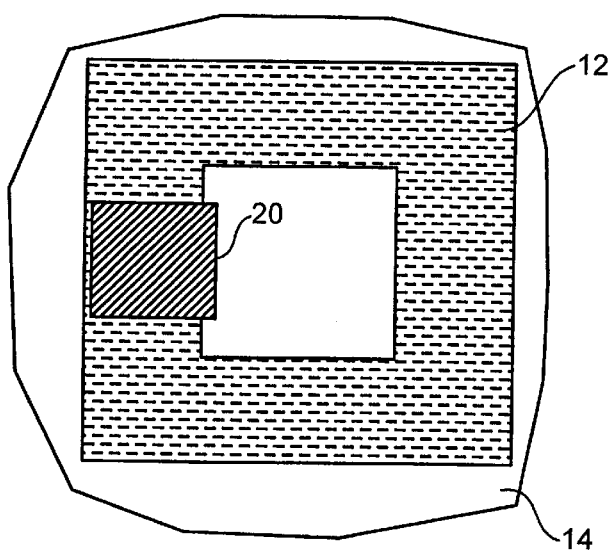
FIG. 8 is a plan view showing the construction of the absolute pressure sensor after the second processing step.

With reference to FIGS. 3 and 8, a second mask is used to form a lead transfer dielectric pad 20 over a peripheral portion of semiconductor membrane 12, as indicated in a second processing step 18 (in FIG. 1). During this step, a 300–700 angstrom thick layer of nitride is deposited using a low pressure chemical vapor deposition (LPCVD) of dichlorosilane ($SiH_2Cl_2$) in the presence of ammonia ($NH_3$), at a pressure of about ½ Torr and at a temperature of about 820° C. The deposited nitride comprises a dielectric material, meaning that it is a good electrical insulator, yet also is a good supporter of electrostatic fields. As explained in detail below, lead transfer dielectric pad 20 is used to electrically isolate a lead transfer conductor from semiconductor membrane 12. Accordingly, in addition to deposition of the nitride, an oxidation layer may be formed atop lead transfer dielectric pad 20 to further improve the electrical isolation characteristics of the pad. As shown in FIG. 8, lead transfer dielectric pad 20 comprises a substantially rectangular pad covering a portion of the periphery of semiconductor membrane 12.

Figure 4:
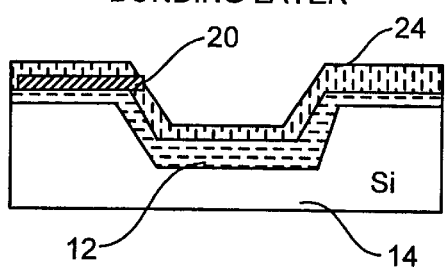
FIG. 4 is a cross-sectional view showing the construction of the absolute pressure sensor after a third processing step, in which a bonding layer is deposited over the dielectric pad and the semiconductor layer.

During a third processing step 22, a bonding layer 24 preferably having a thickness in the range of about 500–5000 angstroms is deposited over semiconductor membrane 12 and lead transfer dielectric pad 20, as shown in FIG. 4. Bonding layer 24 preferably comprises either polysilicon or amorphous silicon and is deposited on membrane 14 using LPCVD, plasma enhanced chemical vapor deposition (PECVD), atmospheric pressure chemical vapor deposition (APCVD), or by sputtering. For example, a bonding layer of polysilicon can be formed using the LPCVD of silane ($SiH_4$) at a temperature of about 560° C.

Figure 5:
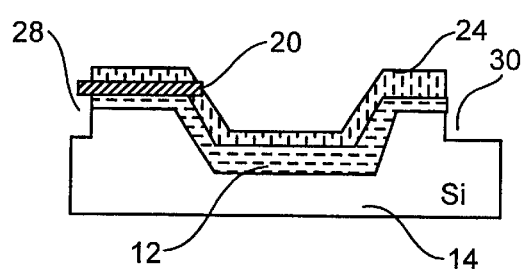
FIG. 5 is a cross-sectional view showing the construction of the absolute pressure sensor after a fourth processing step, in which bulk machining is performed to defined an outline for the sensors membrane.
Figure 9:
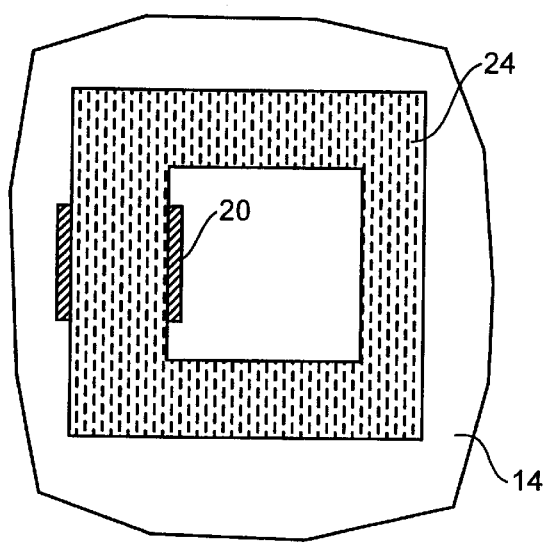
FIG. 9 is a plan view showing the construction of the absolute pressure sensor after the fourth processing step.
Figure 10:
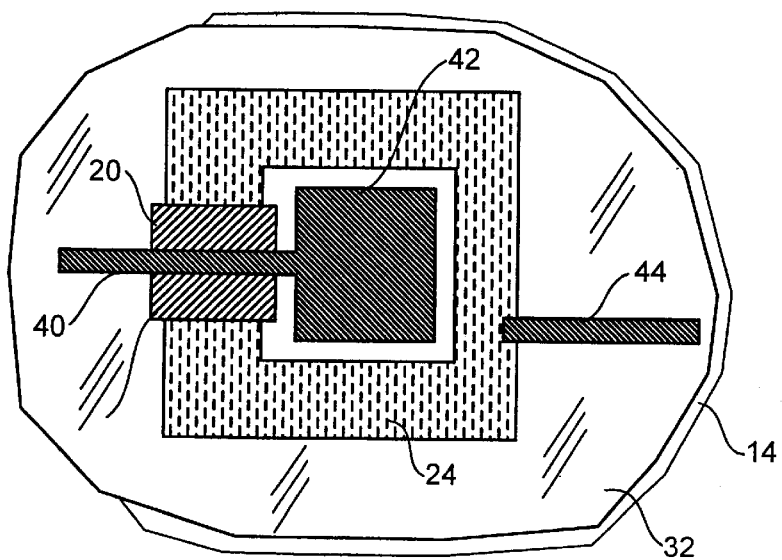
FIG. 10 is a cross-sectional view taken along section line 10—10 of FIG. 7, showing the positional relationship between the semiconductor membrane and a set of conductors disposed on the nonconductive substrate.
Figure 11:
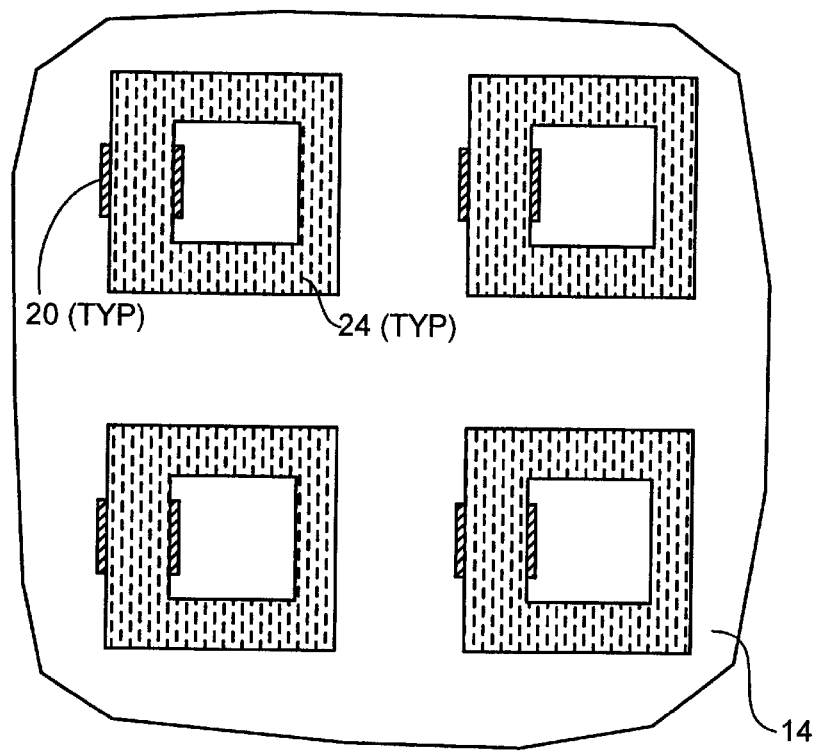
FIG. 11 is a plan view showing a plurality of absolute pressure sensors being fabricated during the fourth processing step, using a batch process.

Next, during a fourth processing step 26 (in FIG. 1), material volumes 28 and 30 are removed from the periphery of the silicon substrate, semiconductor membrane, and bonding layer using bulk machining to a depth that is preferably about 6000 Angstroms below the lower edge of semiconductor membrane 12 to define the external outline of semiconductor membrane 12 and bonding layer 24 for each sensor, as shown in FIGS. 5, 9, and 10. Preferably, this bulk-machining step is performed using reactive ion etching in a plasma reactor using a third mask to define the extent of the material removal.

Figure 6:
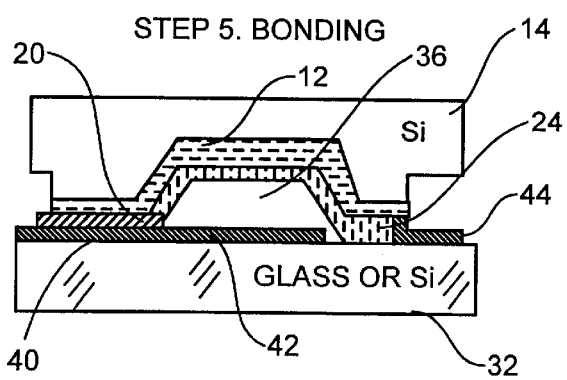
FIG. 6 is a cross-sectional view showing the construction of the absolute pressure sensor after a fifth processing step, in which the bonding layer is bonded to a nonconductive substrate under a vacuum to form a vacuum-sealed reference cavity.
Figure 12:
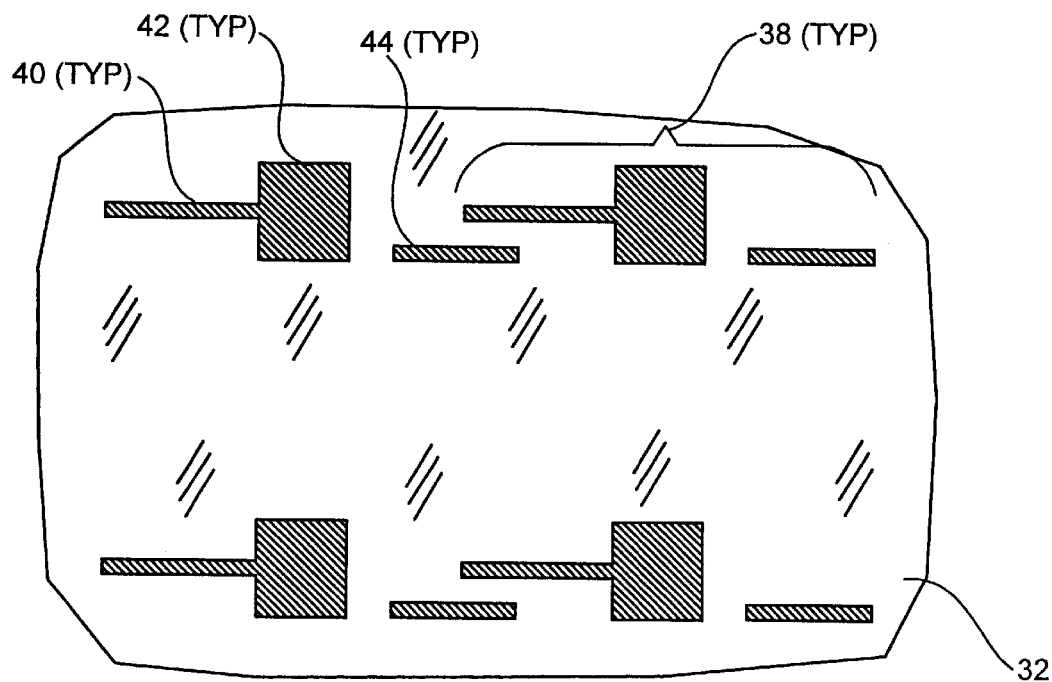
FIG. 12 is a plan view showing an arrangement of a plurality of sets of conductors on the nonconductive substrate for use in the batch process.

In accord with a fifth processing step 34 (FIG. 1) and as shown in FIG. 6, silicon substrate 12 (i.e., the silicon wafer) is turned over and bonded to a nonconductive substrate 32, preferably comprising glass or silicon. This bonding step is carried out while the substrates are in a very-high vacuum (for example., less than one Torr) to produce a vacuum-sealed reference cavity 36 in each sensor. Also, this step is performed using a fourth mask to define the shape of the bonded surfaces. As shown in FIG. 12, a plurality of sets of metal pads 38 are disposed on the upper surface of nonconductive substrate 32; each set of metal pads includes a lead transfer electrode 40 that extends from a capacitor plate 42 and a contact pad 44. Preferably, the metal pads comprise gold that is deposited onto the top surface of nonconductive substrate 32, using a conventional metal layering process such as LPCVD, PECVD, APCVD, or sputtering. As shown in FIG. 10, nonconductive substrate 32 and silicon substrate 14 are aligned prior to the bonding step so that capacitor plate 42 is disposed toward the center of the recessed area of semiconductor membrane 12, and so that lead transfer electrode 40 is disposed adjacent to lead transfer dielectric pad 20, for each sensor. The type of bonding used is dependent upon the material used for nonconductive substrate 32. When nonconductive substrate 32 comprises glass, electrostatic bonding is preferably employed. However, when the nonconductive substrate comprises silicon, conventional silicon wafer bonding techniques are preferably employed.

The bonding process is performed in a manner that ensures an extremely low leak rate between reference cavity 36 and the ambient air surrounding each sensor when the sensor is returned to atmospheric pressure. This minimal leakage rate is achieved through a novel sealing process that represents a key aspect of the invention. During the bonding step, the gold in lead transfer electrode 40 migrates into bonding layer 24 and flows into any micro-voids that may exist between the bonding layer and the nonconductive substrate in the regions where the lead transfer electrode is disposed, thereby forming an eutectic seal where the lead transfer enters reference cavity 36. In contrast, anodic bonding is performed between the bonding layer and the nonconductive substrate in the regions outside of the lead transfer area. This anodic bonding forms an atomic scale seal that enables reference cavity 36 to be maintained at a high vacuum, preferably having a leak rate of less than about $10^{-16}$ standard cubic centimeters per minute (SCCM).

Another key aspect of the present invention is the electrical isolation between lead transfer electrode 40 and semiconductor membrane 12. As discussed above, the gold in lead transfer electrode 40 migrates into bonding layer 24, which comprises either polysilicon or amorphous silicon, producing electrostatic bonding. In contrast, the nitride layer (and an optional oxide layer) in lead transfer isolation pad 20 prevents the gold from migrating into semiconductor membrane 12. As a result, semiconductor membrane 12 is electrically isolated from lead transfer electrode 40.

Figure 7:
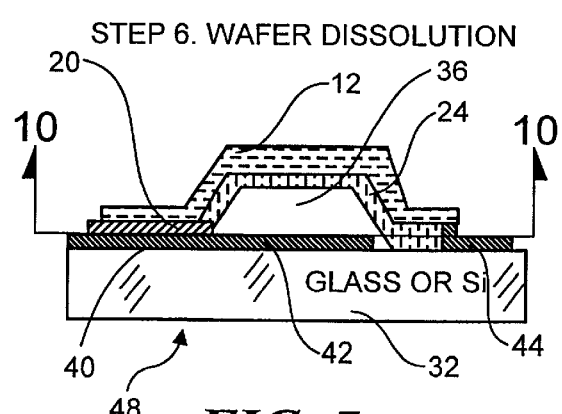
FIG. 7 is a cross-sectional view showing the final configuration of the absolute pressure sensor after a sixth processing step, in which bulk machining is used to define the final shape of the sensors semiconductor membrane.

With reference to FIG. 7, the final shape of a plurality of absolute sensors 48 are defined during a sixth processing step 46 (FIG. 1), in which a major portion of silicon substrate 14 is removed using bulk machining (i.e., dissolved away through a chemical etching process). Dissolution of silicon substrate 14 is preferably performed by etching with ethylene diamine pyrocatechol water, KOH, or by an electrochemical polishing or etching process.

As discussed above, a typical manufacturing facility will perform processing steps 1–6 on a silicon wafer and a glass wafer, or a pair of silicon wafers, to form a plurality of absolute pressure sensors. Each sensor will preferably be approximately 0.75 mm square. After the wafer dissolution step, nonconductive substrate 32 is sawn to separate the sensors individually and/or into groups. It is contemplated that there may be some applications for which it is desirable to provide a group of two or three absolute pressure sensors formed on a single nonconductive substrate.

Figure 13A:
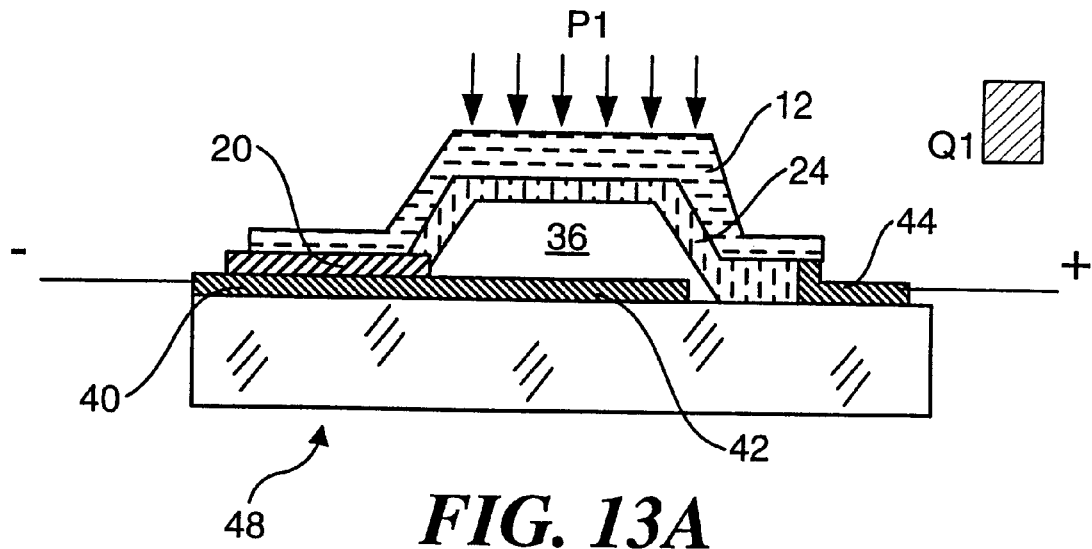
FIGS. 13A and 13B are cross-sectional views of the absolute pressure sensor illustrating (in a somewhat exaggerated manner) how the semiconductor membrane flexes, varying the capacitance of the sensor, in response to a change in external pressure.
Figure 13B:
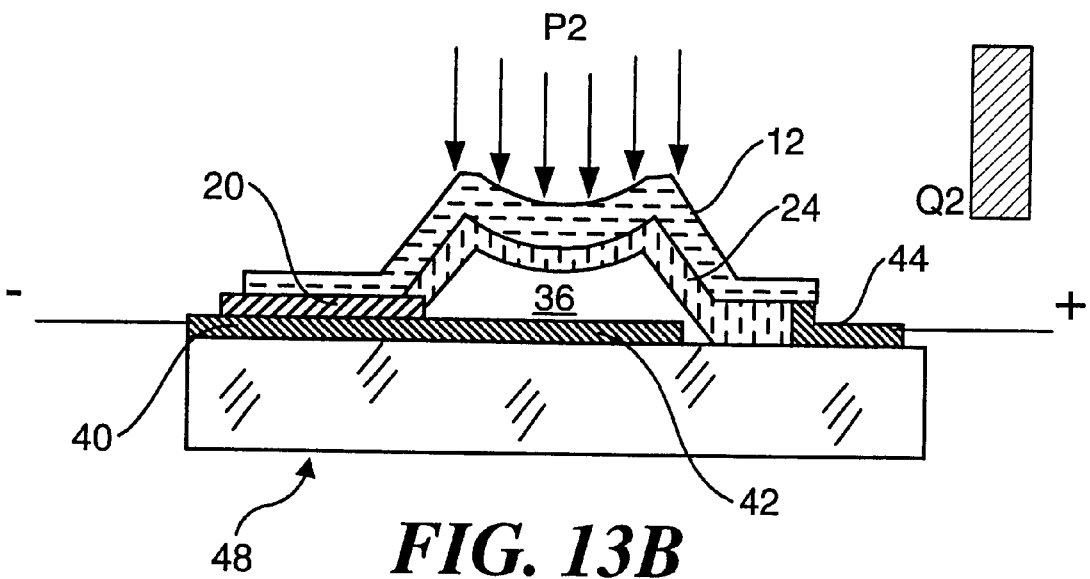

With reference to FIGS. 13A and 13B, absolute pressure sensor 48 operates in the following manner. A voltage differential is applied across lead transfer electrode 40 and contact pad 44, which is in electrical communication with semiconductor membrane 12. This voltage creates a charge "Q" between capacitor plate 42 and semiconductor membrane 12, since the semiconductor membrane serves as a second capacitor plate. The amount of charge Q stored by the capacitance of absolute pressure sensor 48 is dependent on two factors: the applied voltage differential and the distance between capacitor plate 42 and semiconductor membrane 12, i.e., the capacitance of the device. Accordingly, if the voltage differential is held constant, the charge, Q, of the device (or its capacitance) will be directly proportional to the distance between capacitor plate 42 and the semiconductor membrane 12.

Because of the thinness of semiconductor membrane 12 and bonding layer 24, the semiconductor membrane flexes when the pressure exerted by a gas or fluid surrounding the sensor exceeds the pressure in reference cavity 36. Since reference cavity 36 is maintained at a high vacuum (i.e., at a very low absolute pressure), the pressure sensor is able to determine absolute pressure of the surrounding gas or fluid. For example, if absolute pressure sensor 48 is placed in a moderately high vacuum having a pressure of P1, there is only a small pressure differential between the moderately high vacuum and the high vacuum in reference cavity 36. Consequently, there is very little flexing of semiconductor membrane 12, as shown in FIG. 13A. As a result, a charge of Q1 can be stored by the absolute pressure transducer. With reference to FIG. 13B, now suppose the pressure is raised to a much higher (near atmospheric) pressure level P2. The larger pressure differential between the near atmospheric pressure applied externally to the semiconductor membrane and the high vacuum in reference cavity 36 causes semiconductor membrane 12 to flex inwardly, reducing the distance between portions of the semiconductor membrane and capacitor plate 42, thereby reducing the charge Q2 that can be stored by the device, due to its lower capacitance. By sensing the capacitance of the absolute pressure transducer (or sensing the charge stored by the device) using any of the readily calibrated electrical circuits designed for this purpose that are commercially available, an indication can be provided of the absolute pressure of any fluid to which the exterior of the absolute pressure sensor is exposed.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. An absolute pressure sensor, comprising:
   a semiconductor membrane having a welled portion and a substantially planar peripheral surface surrounding and connected to the welled portion;
   a pad of substantially nonconductive material formed directly on a portion of the peripheral surface of the semiconductor membrane;
   a bonding layer deposited on the peripheral surface and the nonconductive pad so as to completely surround the welled portion of the semiconductor membrane;
   a generally planar nonconductive base having an upper surface with spaced apart first and second metal conductors deposited thereon, the upper surface of the nonconductive base being brought into contact with a lower surface of the bonding layer and bonded to the semiconductor membrane in a vacuum so as to form a peripheral seal and a vacuum-sealed reference cavity adjacent the welled portion of the semiconductor membrane;
   the first conductor includes a capacitor plate disposed within the vacuum-sealed reference cavity and an externally accessible lead attached to the capacitor plate and extending continuously and contiguously along the upper surface of the base through the peripheral seal;
   the second conductor being in electrical communication with the semiconductor membrane; and
   the first conductor being electrically isolated from the semiconductor membrane by the pad of substantially nonconductive material.

2. The pressure sensor of claim 1, wherein the semiconductor membrane comprises doped silicon.

3. The pressure sensor of claim 1, wherein the metal conductors comprise a refractory metal.

4. The pressure sensor of claim 3, wherein refractory metal from the first conductor has migrated into the bonding layer and fills any void between the bonding layer and the generally planar nonconductive base proximate to the first conductor to provide a eutectic seal at an interface between the vacuum-sealed reference cavity and the first conductor.

5. The pressure sensor of claim 1, wherein the bonding layer comprises one of a polysilicon and an amorphous silicon.

6. The pressure sensor of claim 1, wherein the substantially nonconductive pad comprises a dielectric material.

7. The pressure sensor of claim 6, wherein the dielectric material comprises a nitride.

8. The pressure sensor of claim 1, wherein the substantially nonconductive pad includes a layer of a substantially electrically nonconductive oxide.

9. The pressure sensor of claim 1, wherein an anodic bond is formed between the bonding layer and the generally planar nonconductive base.

10. The pressure sensor of claim 1, wherein the substantially nonconductive pad has an non-annular cross-section in a plane parallel to the base such that the pad extends less than fully around the peripheral seal.

11. The pressure sensor of claim 4, wherein the refractory metal is gold.

12. The pressure sensor of claim 1, wherein the generally planar nonconductive base is made of silicon.

13. An absolute pressure sensor, comprising:
   a semiconductor membrane having a welled portion and a substantially planar peripheral surface surrounding and connected to the welled portion;
   a pad of substantially nonconductive material formed directly on a portion of the peripheral surface of the semiconductor membrane;
   a bonding layer deposited on the peripheral surface and the nonconductive pad so as to completely surround the welled portion of the semiconductor membrane;
   a generally planar nonconductive silicon base having an upper surface with spaced apart first and second metal conductors deposited thereon, the upper surface of the nonconductive base being brought into contact with a lower surface of the bonding layer and bonded to the semiconductor membrane in a vacuum so as to form a peripheral seal and a vacuum-sealed reference cavity adjacent the welled portion of the semiconductor membrane;
   the first conductor includes a capacitor plate disposed within the vacuum-sealed reference cavity and an externally accessible lead attached to the capacitor plate and extending continuously and contiguously along the upper surface of the base through the peripheral seal;
   the second conductor being in electrical communication with the semiconductor membrane;
   the first conductor being electrically isolated from the semiconductor membrane by the pad of substantially nonconductive material; and
   the substantially nonconductive pad having a non-annular cross-section in a plane parallel to the base such that the pad extends less than fully around the peripheral seal.

* * * * *